US 6,539,793 B2

(12) United States Patent
Tanimoto et al.

(10) Patent No.: US 6,539,793 B2
(45) Date of Patent: Apr. 1, 2003

(54) FLOW RATE DETECTOR

(75) Inventors: Koji Tanimoto, Tokyo (JP); Shinji Taniguchi, Tokyo (JP); Tomoya Yamakawa, Tokyo (JP); Ryuji Toyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,407

(22) Filed: Oct. 24, 2001

(65) Prior Publication Data
US 2002/0170352 A1 Nov. 21, 2002

(30) Foreign Application Priority Data
May 18, 2001 (JP) ........................................ 2001-148904

(51) Int. Cl.[7] .................................................. G01F 1/68
(52) U.S. Cl. .................................................. 73/204.15
(58) Field of Search ........................ 73/204.15, 204.14, 73/204.26; 324/615, 616, 76.13, 76.11

(56) References Cited

U.S. PATENT DOCUMENTS

| 3,763,427 A | * | 10/1973 | Stengel et al. ............... 324/605 |
| 3,875,500 A | * | 4/1975 | Fletcher et al. ............ 178/69 A |
| 4,085,361 A | * | 4/1978 | Bathiany et al. ............. 324/604 |
| 4,934,189 A | * | 6/1990 | Tanimoto et al. ........... 73/118.2 |
| 5,117,691 A | * | 6/1992 | Fraser ....................... 73/204.15 |
| 5,753,815 A | * | 5/1998 | Murata ...................... 73/204.15 |
| 6,223,593 B1 | * | 5/2001 | Kubisiak et al. ......... 73/204.15 |

FOREIGN PATENT DOCUMENTS

JP        2000-205915        7/2000        .............. G01F/1/68

* cited by examiner

Primary Examiner—Hezron Williams
Assistant Examiner—Jewel V. Thompson
(74) Attorney, Agent, or Firm—Sughrue Mion, PLLC

(57) ABSTRACT

The invention provides a flow rate detector capable of precisely detecting a flow rate of an object fluid and effectively reducing a leaning error even when the object fluid is pulsating, thereby improving precision in detection of flow rate. The flow rate detector comprises a flow detector 50 for outputting a flow-detecting signal Sf according to a flow rate of the object fluid utilizing heat transfer phenomenon from an exothermic resistor 12 disposed in a fluid passage to the object fluid, and a gain compensator 60 for compensating an error in a flow-detecting signal Sf by amplifying the flow-detecting signal Sf from the flow detector 50, wherein the gain compensator 60 is arranged to amplify the flow-detecting signal Sf by a substantially constant alternating current gain G3 larger than a direct current gain G1 at the time of zero frequency, in a frequency range higher than a frequency f2A corresponding to the minimum pulsating frequency of the object fluid.

9 Claims, 12 Drawing Sheets

FIG.4

FLOW RATE DETECTOR

BACKGROUND OF THE INVENTION

1. Technical Field

The present invention relates mainly to a flow rate detector of thermal type such as the one employed for detecting amount of intake air in vehicle engines, and more particularly to a method for improving precision in detection of a pulsating flow in vehicle engines.

2. Background Art

Generally in vehicle engines, a mixed gas of fuel and intake air is combusted in a combustion chamber of an engine, and a rotating power is generated utilizing a combustion pressure produced by the combustion. Therefore it is essential to precisely detect a flow rate of intake air in order to properly control injection amount at the time of combustion. For that purpose, various thermal type flow rate detectors for detecting a flow rate of intake air have been heretofore proposed, including a flow rate detector disclosed in the Japanese Patent Publication (unexamined) No.22563/1982.

Flow rate of intake air in vehicle engines varies depending on driving conditions of an engine. For example, when engine speed is constant, airflow-resistance in a throttle valve decreases, as opening of the throttle valve becomes larger. As a result, pressure in intake manifold increases thereby increasing a flow rate, and amplitude of pulsating flow becomes larger.

With respect to such pulsating flow, the relation between flow rate and output of detection is non-linear, and thermal response of an exothermic resistor is delayed. Therefore, when converting every detected output into pulsating flow using a thermal type flow rate detector, an average value of the detected flow rate becomes smaller than actual flow rate (this phenomenon is hereinafter referred to as leaning error). This leaning error augments as engine speed becomes higher and as pulsation amplitude becomes larger.

FIG. 7 is a characteristic diagram showing a relation between pressure P of intake manifold according to extent of opening of throttle valve and flow rate (average of flow rate signals) Qav of intake air.

Referring to FIG. 7, reference code Ca shows a curve of actual flow rate with increasing opening of a throttle valve under a constant engine speed. On the other hand, code Cb in FIG. 7 shows a curve of average flow rate detected by a conventional thermal flow rate detector. It is understood that a leaning error $\Delta l$ is produced between the mentioned curves Ca and Cb. In case that a flow rate detecting characteristic appears as shown by the mentioned curve Cb, an identical flow rate may be detected under two loading conditions different from each other, which brings about a disadvantage of making it impossible to uniquely determine a flow rate.

In view of the foregoing disadvantage that a leaning error $\Delta l$ is produced due to a lower detected flow rate than actual amount of intake air, a flow dividing type thermal flow rate detector of was proposed, as disclosed in the Japanese Patent Publication (unexamined) No.19510/1983 (hereinafter referred to as Prior Art 1).

In this Prior Art 1, a passage for divided flow, used as flow detecting tube in which an exothermic resistor is disposed, is formed longer than a passage for main flow, in order to increase inertia of air-flow in the mentioned passage for divided flow. As a result, an average flow rate through the passage for divided flow becomes larger than a flow rate of steady flow, and moreover pulsation amplitude of flow velocity in the passage for divided flow decreases. Therefore the mentioned detecting error due to delay in thermal response of exothermic resistor can be offset by properly establishing a ratio of inertia length of the passage for divided flow and the main passage.

Also, the Japanese Patent Publication (unexamined) No.205915/2000 discloses a thermal flow rate detector which compensates flow detecting error of a pulsating flow, using gain compensating means incorporated in a flow rate detector (hereinafter referred to as Prior Art 2).

This flow rate detector of Prior Art 2 comprises a flow computing circuit for computing a flow-detecting signal according to a flow rate on the basis a resistance value of a thermo-sensitive resistor disposed in a passage of an object fluid, and gain compensating means for amplifying a flow-detecting signal from the mentioned flow computing circuit, thereby compensating a gain lowered by a thermal time constant of a thermo-sensitive resistor.

FIG. 5 is a characteristic diagram showing a relation of gain and frequency characteristic of gain compensating means. Referring to FIG. 5, axis of ordinates stands for gain G of the gain compensating circuit, axis of abscissas stands for frequency f, and code To shows a curve of frequency characteristic of gain compensating means disclosed in the Prior Art 2.

Accordingly, in the flow rate detector of the Prior Art 2, when the pulsating flow frequency is below the first predetermined frequency f1B, the flow computing circuit outputs a flow-detecting signal of which value is substantially corresponding to the pulsating flow. At this time, the mentioned gain compensating means amplifies the flow-detecting signal by a predetermined constant gain G1.

On the other hand, when the pulsating flow frequency is higher than the first predetermined frequency f1B, the output of a flow-detecting signal from the flow computing circuit becomes lower due to thermal time constant of a thermo-sensitive resistor. The output of a flow-detecting signal becomes lower also due to non-linear relation between flow rate and flow-detecting signal. At this time, the gain compensating means amplifies flow-detecting signals by a gain G2 that corresponds to the frequency. As a result, the delay caused by thermal time constant of the thermo-sensitive resistor is compensated, and the gain compensating means outputs a waveform close to the variation in actual flow rate.

Further, when the pulsating flow frequency is higher than the second predetermined frequency f2B, the gain compensating means amplifies a flow-detecting signal outputted by flow computing circuit by a gain G3 (>G1). As a result, a flow-detecting signal on the higher frequency side, which has little influence on the flow detection, is not amplified more than is required. As a result, a flow detecting error on the higher frequency side is not caused, and precision in flow detection is improved.

It is certain that the device according to the Prior Art 1 offsets a detecting error of a pulsating flow caused by delay in thermal response of an exothermic resistor. But a complicated structure is required to secure a necessary length of passage for divided flow, and the flow tends to be disorderly or turbulent in the proximity of the exothermic resistor. Moreover, there is a disadvantage that sufficient flow detection sensitivity cannot be secured because flow velocity in the proximity of the exothermic resistor for detecting flow rate becomes slower than the velocity of main flow.

Also, it is certain that gain compensating means according to the Prior Art 2 can compensate a decline of a flow-detecting signal caused by thermal time constant of the thermo-sensitive resistor. But a decline in flow-detecting signal still may take place depending on the waveform of pulsation or structure of thermo-sensitive resistor and flow detecting tube in which a thermo-sensitive resistor is disposed, in the pulsating flow having a frequency lower than f1B predetermined by thermal time constant of thermo-sensitive resistor. This may result in a large leaning error from actual flow rate. This point is now described in more detail.

As one of the important causes of a leaning error occurring even in the detection of a pulsating flow of a lower frequency than f1B predetermined by thermal time constant of thermo-sensitive resistor, there is a difference in flow rate between main tube and flow detecting tube, depending upon whether it is a pulsating flow or a steady flow. For example, in case that a flow detecting tube is contracted toward the outlet in order to improve the stability of flow, the area of outlet passage is smaller than the area of inlet passage. In the flow detecting tube of such contraction, a pulsating flow of high frequency generates swirling flows that are not formed from a steady flow, in the proximity of the outlet of flow detecting tube, thus making it difficult for the object fluid to flow into the flow detecting tube. As a result, a fluid loss of a pulsating flow in the flow detecting tube becomes larger than a fluid loss of a steady flow. Therefore an average flow rate of a pulsating flow in the flow detecting tube becomes lower than an average flow rate of a steady flow. This phenomenon wherein a pulsating flow performs different actions from a steady flow in a flow detecting tube is hereinafter defined as transient characteristic. In general, this transient characteristic is more prominent in a frequency range considerably lower than the frequency f1B determined by thermal time constant of thermo-sensitive resistor.

On the other hand, as shown by the characteristic curve To in FIG. 5, the gain G1 of the gain compensating means according to the Prior Art 2 is a constant value with respect to a pulsating flow of lower frequency than the f1B predetermined by thermal time constant of thermo-sensitive resistor. Therefore, the effect of minimizing a leaning error of the mentioned gain compensating means is not sufficiently performed resulting in the leaning error. Consequently an accurate flow rate cannot be obtained.

SUMMARY OF THE INVENTION

The present invention was made to solve the above-discussed problems incidental to the prior arts, and has an object of providing a flow rate detector in which flow rate of an object fluid is detected by effectively reducing a leaning error even when the object fluid is pulsating, thereby improving detecting precision.

To accomplish the foregoing object, a flow rate detector according to the present invention is constituted as follows.

A first embodiment of the invention discloses a flow rate detector comprising:

flow detecting means for outputting a flow-detecting signal according to a flow rate of an object fluid utilizing heat transfer phenomenon to the object fluid from an exothermic resistor disposed in a fluid passage; and gain compensating means for compensating a gain of the mentioned flow-detecting signal by amplifying the mentioned signal outputted by the mentioned flow detecting means;

in which the mentioned gain compensating means amplifies the mentioned flow-detecting signal with a substantially constant alternating current gain larger than a direct current gain at the time of zero frequency in a frequency range higher than a minimum pulsating frequency of the object fluid.

A second embodiment of the invention discloses a flow rate detector comprising:

temperature difference detecting means for detecting a difference between temperatures of thermo-sensitive resistors respectively disposed on upstream side and downstream side of an exothermic resistor disposed in a fluid passage; and gain compensating means for compensating a gain of a flow-detecting signal by amplifying a temperature difference detecting signal from the mentioned temperature difference detecting means inputted as flow-detecting signal;

in which the mentioned gain compensating means amplifies the mentioned flow-detecting signal with a substantially constant alternating current gain larger than a direct current gain at the time of zero frequency in a frequency range higher than a minimum pulsating frequency of the object fluid.

A third embodiment of the invention discloses a flow rate detector comprising:

temperature detecting means for separately detecting temperatures of thermo-sensitive resistors respectively disposed on upstream side and downstream side of an exothermic resistor disposed in a fluid passage; and flow rate computing means for computing a flow-detecting signal based on a temperature detecting signal outputted by the mentioned temperature detecting means;

in which the mentioned flow rate computing means consists of: first phase compensating means for amplifying and outputting a phase-advanced temperature detecting signal of an advanced phase corresponding to a temperature of a thermo-sensitive resistor disposed on upstream side of the exothermic resistor; second phase compensating means for amplifying and outputting a temperature detecting signal of an advanced phase corresponding to a temperature of a thermo-sensitive resistor disposed on downstream side of the exothermic resistor; and a differential amplifier for outputting as a flow-detecting signal a difference between output signals from the mentioned respective phase compensating means.

Preferably, in the second embodiment of the invention, both of the mentioned first and second phase compensating means consist of gain compensating means for amplifying the mentioned temperature detecting signal by a substantially constant alternating current gain larger than a direct current gain at the time of zero frequency, in the frequency range higher than the minimum pulsating frequency of the mentioned object fluid.

Preferably, in the flow rate detector according to the first embodiment of the invention, a flow-detecting signal is amplified by a constant gain larger than a gain of non-pulsating steady flow, in a predetermined frequency range in which an average value of a flow-detecting signal is lowered due to flow characteristics in the proximity of a flow detecting tube, flow detecting element or the like. Therefore, output amplitude of the gain compensating means becomes larger with the advance of phase. As a result, the average detected value of flow rate becomes larger due to non-linearity of flow characteristics, and a flow-detecting signal becomes close to actual average flow rate. Consequently, a leaning error in average flow-detecting signal is minimized even when an object fluid is pulsating, resulting in precise detection of flow rate of the object fluid.

Preferably, in the flow rate detector according to the second embodiment of the invention, since the aforementioned temperature difference detecting means detects a difference between temperatures of respective thermo-sensitive resistors disposed on upstream and downstream sides of an exothermic resistor, pulsating wave of a counter flow can also be detected. Also, a temperature difference detecting signal from the temperature difference detecting means is inputted to the gain compensating means as a flow-detecting signal, and the gain compensating means advances the phase of the mentioned signals, thus performing apparently quicker responses. Furthermore, a flow-detecting signal is amplified by a constant gain larger than a gain of non-pulsating steady flow, and therefore the average value of detected flow rate becomes larger and a flow-detecting signal close to actual average flow rate is attained. Consequently, in the same manner as in the first embodiment, a leaning error of an average flow-detecting signal is minimized even when an object fluid is pulsating, resulting in precise detection of flow rate of the object fluid.

In the flow rate detector according to the third embodiment of the invention, signal responses apparently become quicker by advancing the phase of respective temperature detecting signals of thermo-sensitive resistors disposed on upstream and downstream sides of an exothermic resistor. Furthermore, pulsating wave of a counter flow can also be detected. Therefore since a flow-detecting signal computed from the temperature difference of thermo-sensitive resistors is still closer to actual waveform of pulsation, the precision in flow detection is further improved.

In the flow rate detector according to the third embodiment of the invention, since the phase compensating means comprises the same gain compensating means as disclosed in the first embodiment, both of the advantages described in relation to the first embodiment are performed.

BRIEF DESCRIPTION OF THE DRAWINGS

FIG. 4 is a block diagram showing an entire arrangement of a flow rate detector according to Embodiment 1 of the invention.

DESCRIPTION OF THE PREFERRED EMBODIMENTS

Embodiment 1

Figure 1:
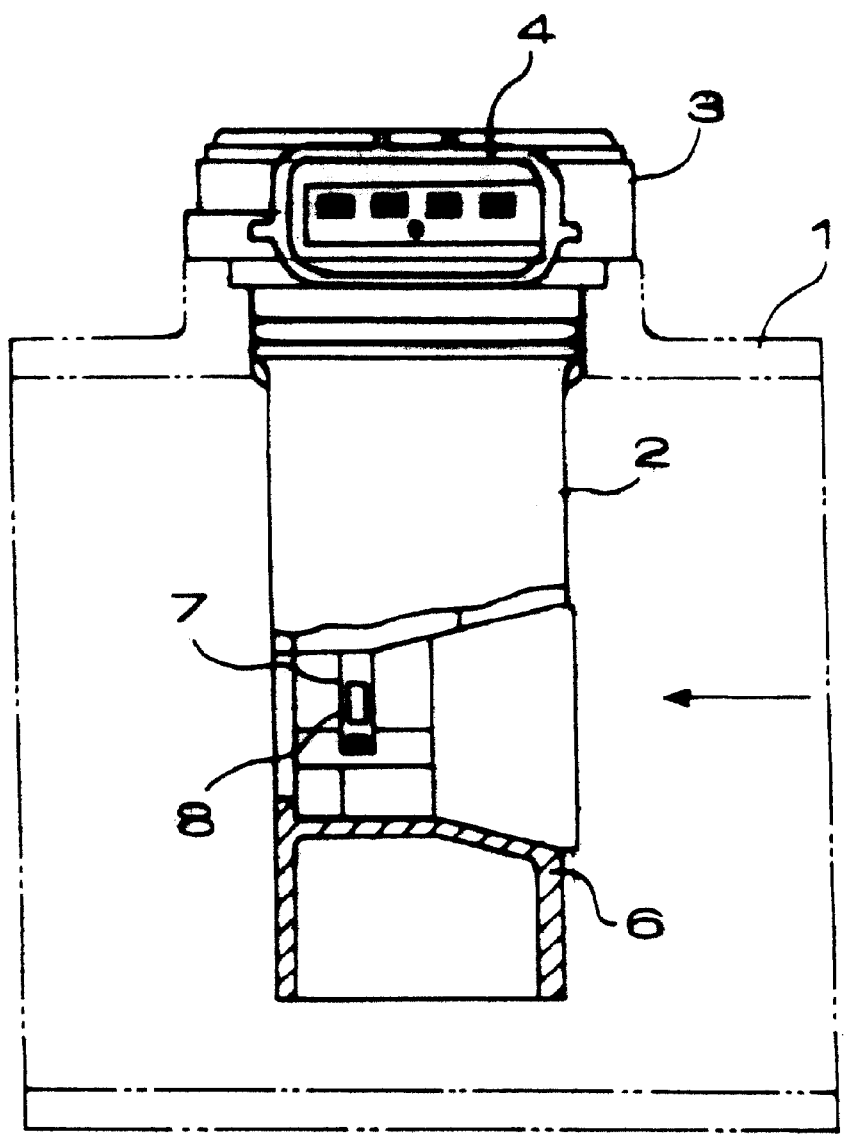
FIG. 1 is a partially sectional front view of a flow rate detector according to Embodiment 1 of the present invention.
Figure 2:
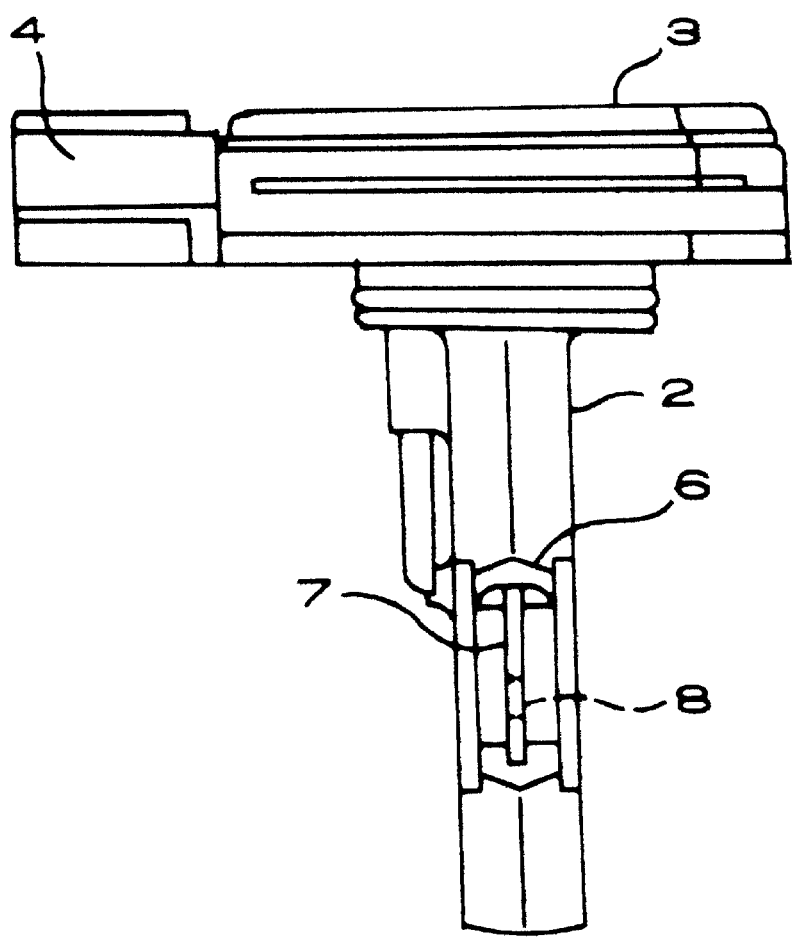
FIG. 2 is a side view of the flow rate detector according to Embodiment 1 of the invention.
Figure 3:
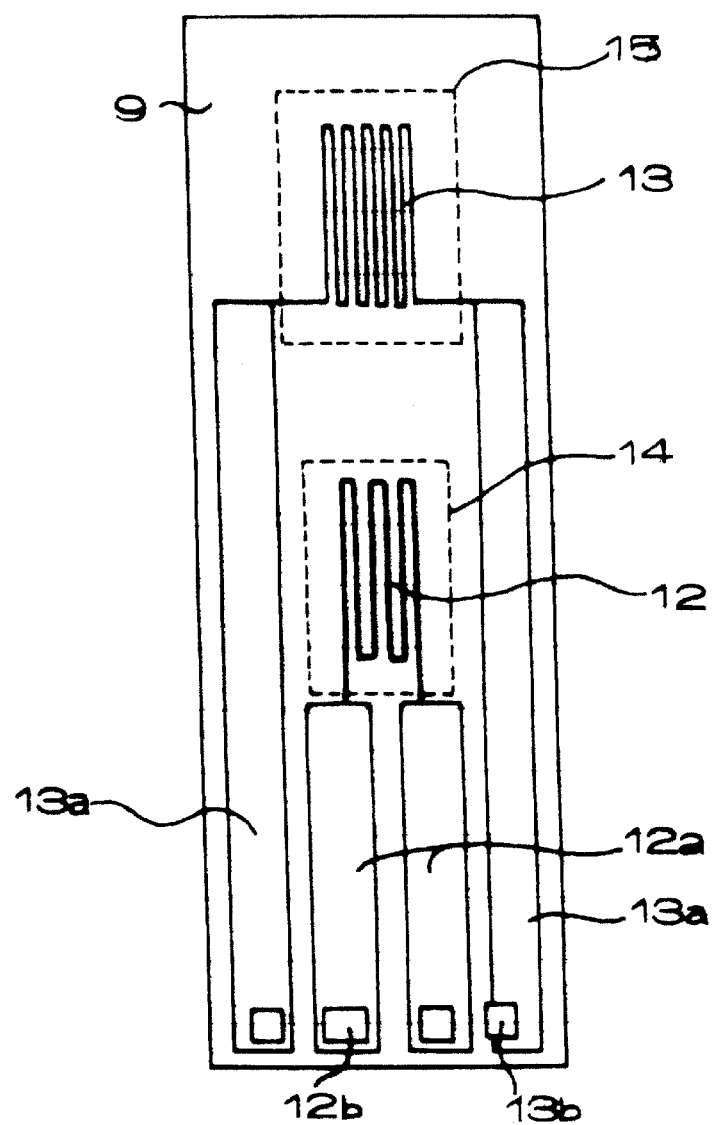
FIG. 3 is a plan view of the detecting element according to Embodiment 1 of the invention.

FIG. 1 is a partially sectional front view of a flow rate detector according to Embodiment 1 of the present invention, and FIG. 2 is a side view of the same flow rate detector.

A flow rate detector according to Embodiment 1 comprises an element housing 2 mounted within a main flow tube 1 through which an object fluid such as intake air flows, and a circuit housing 3 mounted outside of the main flow tube 1. In the circuit housing 3, a connector section 4 for electrical connection of an engine control unit (hereinafter referred to as ECU) 40 to be later described is integrally incorporated in one body. Downstream side of the main flow tube 1 is connected to piping to a throttle body not shown in the drawing.

The element housing 2 is provided with a flow detecting tube 6 gradually tapered from inlet side toward outlet side thereof. A detecting element 8 is fixed in the mentioned flow detecting tube 6 through a holder 7, in such a manner that the surface of the detecting element 8 is almost flush with the holder 7. Further, a later described detecting circuit section 30 is disposed in the circuit housing 3.

The above mentioned detecting element 8 comprises an exothermic resistor 12 and a thermo-sensitive resistor 13 respectively disposed vertically on the surface side of a silicon substrate 9, putting an insulating film therebetween. Further, a part of the reverse side of the silicon substrate 9 is removed by etching at several positions where the mentioned resistors are formed, and diaphragms 14 and 15 of several microns in thickness are formed at the removed positions. This arrangement is to reduce the heat capacity of the mentioned resistors.

The mentioned exothermic resistor 12 and thermo-sensitive resistor 13 are both made of a material of which resistance varies depending on temperature such as platinum film. Both resistors 12 and 13 are extended to the end of the silicon substrate 9 through leads 12*a* and 13*a*. The mentioned resistors 12 and 13 are adhered onto the silicon substrate 9 with an insulating film therebetween by vapor deposition or spattering to be approximately 0.2 μm in film thickness, and then formed by patterning. Also, spattering over both of the mentioned resistors 12 and 13 forms a protective film made of an insulating material. Further, a part of the mentioned protective film is removed and opened at the end of the leads 12*a* and 13*a* to form electrode sections 12*b* and 13*b*. Those electrode sections 12*b* and 13*b* enables electric connection to outside.

Figure 4:
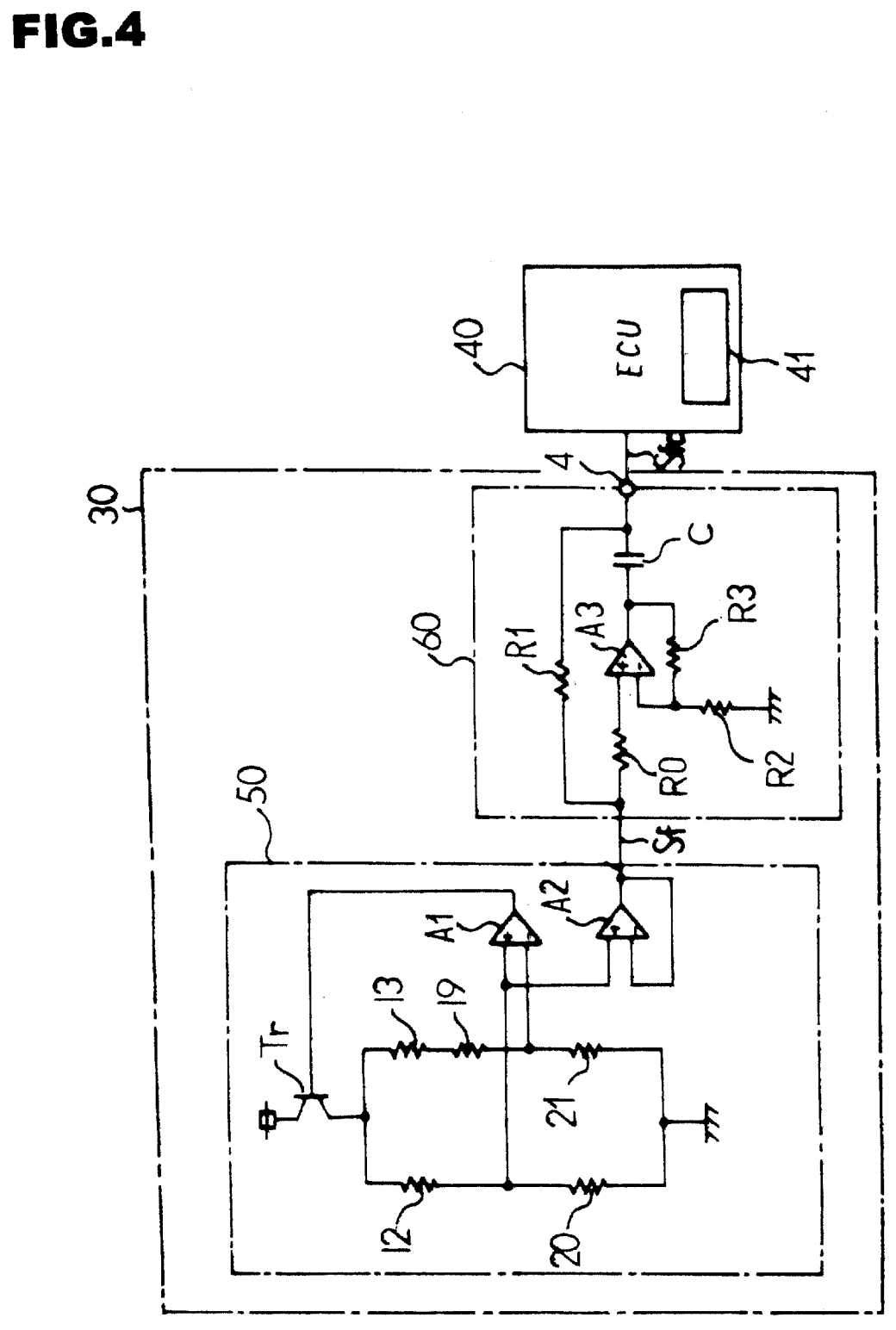

FIG. 4 is a block diagram showing an entire arrangement of a flow rate detector according to Embodiment 1 of the invention.

Referring to FIG. 4, reference numeral 30 is a detecting circuit section disposed in the circuit housing 3. Numeral 40 is an ECU for determining a flow rate of an object fluid such as intake air according to output signals from the mentioned detecting circuit section 30 and for controlling, for example, injection amount for engine combustion. The detecting circuit section 30 and the ECU 40 are electrically connected to each other through the mentioned connector section 4.

The detecting circuit section 30 consists of flow detecting means 50 and gain compensating means 60. In this Embodiment 1, the flow detecting means 50 is provided with an exothermic resistor 12 and a thermo-sensitive resistor 13 of the mentioned detecting element 8, as well as with three fixed resistors 19, 20 and 21. These resistors 12, 13, 19, 20 and 21 form a bridge circuit. Further, a differential amplifier A1 for amplifying a difference of outputs of the mentioned bridge circuit and a transistor Tr for current control form a feedback system for maintaining the temperature of the exothermic resistor 12 at a constant level. Furthermore, an operational amplifier A2, to which a voltage generated by the fixed resistor 20 is inputted, is connected to the middle point of connection between the exothermic resistor 12 and the fixed resistor 20 constituting the bridge circuit.

In the flow detecting means 50, the exothermic resistor 12 is controlled to have a temperature higher than the thermo-sensitive resistor 13 by a given degree. Therefore when the exothermic resistor 12 is cooled by a flow of an object fluid such as intake air, the output of the differential amplifier $\Delta l$ changes the base current of the transistor Tr. In response to this change, the heating current supplied to the exothermic resistor 12 is increased, and the extent of such increase serves as a function of flow rate. Consequently, a voltage generated by the resistor 20 connected in series to the exothermic resistor 12 is inputted to the operational amplifier A2, which in turn outputs a flow-detecting signal Sf.

On the other hand, the gain compensating means 60 consists of an operational amplifier A3; a resistor R0 connected to a non-inversion input terminal of the mentioned operational amplifier A3; a capacitor C for establishing a frequency characteristic and connected to the rear side of the operational amplifier A3; a by-pass resistor R1 connected in parallel to the series circuit consisting of the resistor R0, operational amplifier A3 and capacitor C; and fixed resistors R2 and R3 for determining an alternating current gain in a predetermined frequency range connected to the inversion input terminal of the operational amplifier A3.

As described above, a leaning error due to transient characteristic of the detecting tube 6 in which the thermo-sensitive resistor is disposed is caused in an area of frequency lower than a frequency f1B (according to FIG. 5) determined by thermal time constant of the thermo-sensitive resistor 13.

To cope with this, it is preferable that, in the gain compensating means 60, a frequency f2A where an alternating current gain G3 ensures the compensation of a leaning error due to transient characteristic is established in the proximity of the minimum pulsating frequency of an engine. For example, the minimum frequency of a pulsating flow in idling state of a 4-cilinder engine is 10 to 20 Hz. In this case, it is desirable to establish the alternating current gain G3 for flow-detecting signal Sf to be within a range of 1.05 to 1.3 times, depending on transient characteristic of the flow detecting tube 6 and time constant of the thermo-sensitive resistor 13. The reason for establishing the mentioned range is now described. That is, if value of the alternating current gain G3 is larger, fluctuation in output signal of the gain compensating means 60 becomes too large. Moreover a flow-detecting signal becomes larger than actual flow rate exceeding the maximum acceptable input value of the ECU 40 in case of rapid acceleration. On the other hand, if the alternating current gain G3 is smaller, compensation effect of the gain compensating means 60 is not accomplished. In a frequency range lower than f1A where the transient characteristic of the flow detecting tube is negligible, a direct current gain G1=1 can remain as it is because a leaning error is minimal.

From the foregoing viewpoint, a relation between each predetermined frequency, gains and circuit constant in the gain compensating means 60 is established as follows:

$f1A=1/\{2nCR1\}$ $f2A=1/\{2nCR1\cdot(1+R3/R2)\}$ $G1=1$ $G3=1+(R3/R2)$

Figure 5:
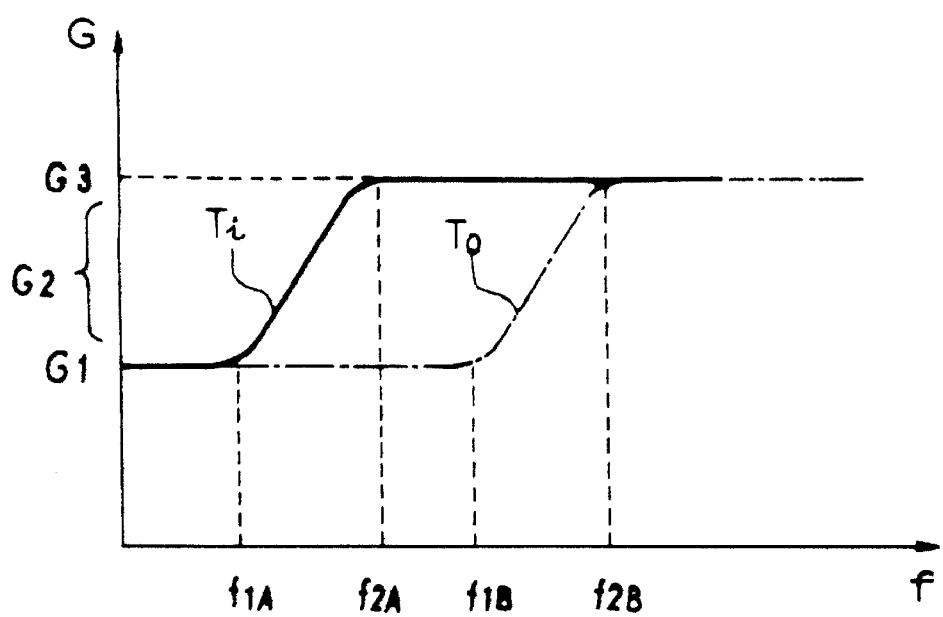
FIG. 5 is a diagram showing frequency characteristic of the gain compensating means according to the invention.

Referring to FIG. 5, code Ti shows a curve of frequency characteristic of the gain compensating means 60 according to this Embodiment 1, while code To shows a curve of frequency characteristic of gain compensating means according to Prior Art 2. In FIG. 5, the proximity of the frequency f1A corresponds to the aforementioned frequency determined by transient characteristic of the flow detecting tube 6, and frequency f2A corresponds to the minimum pulsating frequency of an engine. Frequency f1B corresponds to a frequency predetermined by thermal time constant of a thermo-sensitive resistor. The gain G3 is substantially constant regardless of frequency in the area higher than the minimum pulsating frequency of an engine f2A. As shown in FIG. 5, in the flow rate detector according to this Embodiment 1, the frequency characteristic of the gain compensating means 60 provides an increased gain in the lower frequency range than the flow rate detector according to Prior Art 2.

Figure 6:
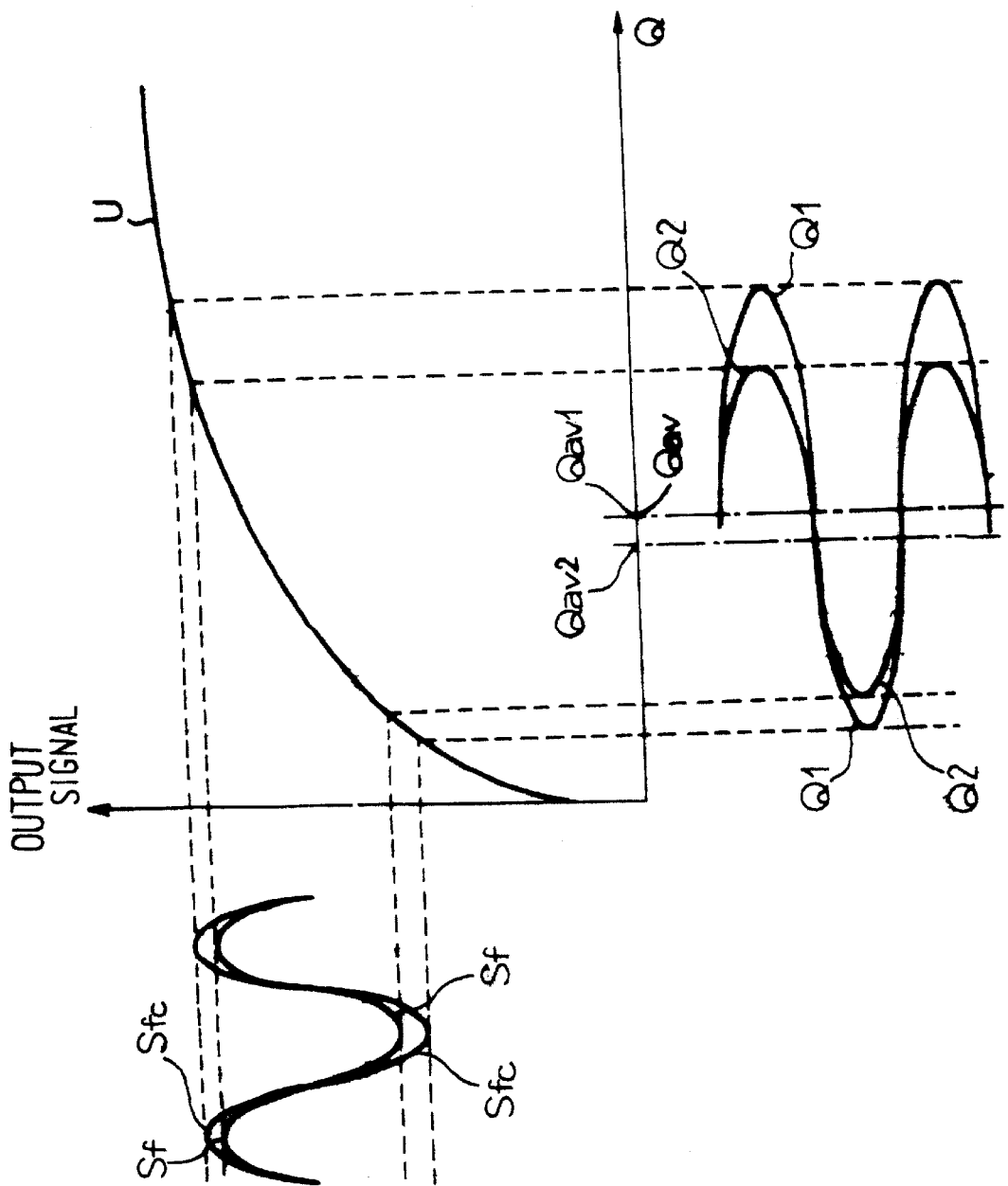
FIG. 6 is a characteristic diagram showing a relation between flow rate of a pulsating flow and flow-detecting signals.

The ECU 40 is provided with a memory 41, in which a characteristic curve U defining a relation between a flow-detecting signal Sfc outputted by the gain compensating means 60 and a flow rate Q is preliminarily stored, as shown in FIG. 6. Note that the mentioned curve U shows a non-linear characteristic of the relation between the flow rate Q and the flow-detecting signal Sfc.

The flow-detecting signal Sfc outputted by the gain compensating means 60 is converted one after another to flow rate by the ECU 40 according to the characteristic curve U preliminarily stored in the memory 41, and then an average value of flow rate Qav is computed.

In the flow rate detector of above arrangement, detecting operation of a flow rate is performed as described hereunder.

When the exothermic resistor 12 is cooled by a flow of an object fluid such as intake air, the output of the differential amplifier $\Delta l$ changes the base current of the transistor Tr, and in response to this change, the heating current supplied to the exothermic resistor 12 is increased. Then a voltage generated by the fixed resistor 20 connected in series to the exothermic resistor 12 is inputted to the operational amplifier A2, which amplifies the voltage and outputs it as flow-detecting signal Sf.

The following description relates to a case wherein a flow is pulsating in a flow detecting tube 6 within a frequency range between f2A and F1B according to FIG. 5.

In the device according to Prior Art 2, a flow-detecting signal Sf is outputted from a flow computing circuit without being amplified at all by the gain compensating means, in a frequency range lower than f1B. Therefore, pulsating amplitude of the flow-detecting signal Sf drifts to a lower flow rate zone because of transient characteristics of the flow detecting tube 6, as shown in FIG. 6. As a result, an average value Qav2 of flow rate signal Q2 converted according to the characteristic curve U preliminarily stored in the memory 41 in the ECU 40 becomes smaller than the actual average flow rate Qav.

On the other hand, in the flow rate detector according to this Embodiment 1, the flow-detecting signal Sf of the mentioned pulsating flow outputted by the flow detecting means 50 is amplified by the gain compensating means 60 by a predetermined constant gain G3. Therefore, the amplitude of flow rate signal Q1 converted from the flow-detecting signal Sfc amplified and outputted by the gain compensating means 60 according to the characteristic curve U preinstalled in the memory 41 in the ECU 40 is amplified in a larger scale than the flow rate signal Q2 achieved in Prior Art 2. More specifically, since the characteristic curve U is non-linear, the amplitude of the flow rate signal Q1 converted from the flow-detecting signal Sfc is further amplified to a higher flow rate zone, resulting in a larger average detected flow rate Qav1. Consequently, the average detected flow rate Qav1 computed according to the flow-detecting signal Sfc including a compensated gain becomes closer to actual average flow rate Qav.

In this manner, in the conventional art, a pulsating flow of a frequency range lower than f1B corresponding to thermal time constant of a thermo-sensitive resistor is amplified by a constant gain G1. Therefore amplitude of a detecting signal is reduced and accordingly an average detected flow rate is also reduced, eventually resulting in a larger leaning error. On the other hand, in the flow rate detector according to this Embodiment 1, amplitude of a detecting signal becomes larger by a constant gain G3 because G3>G1. Therefore an average detected flow rate becomes close to actual flow rate, resulting in a minimized leaning error. Moreover, the flow-detecting signal Sfc of a frequency higher than the predetermined frequency f2A is amplified by a substantially constant gain G3, and therefore the mentioned detecting signal of a high frequency that has little influence to flow detection will not be amplified more than is really required.

Figure 7:
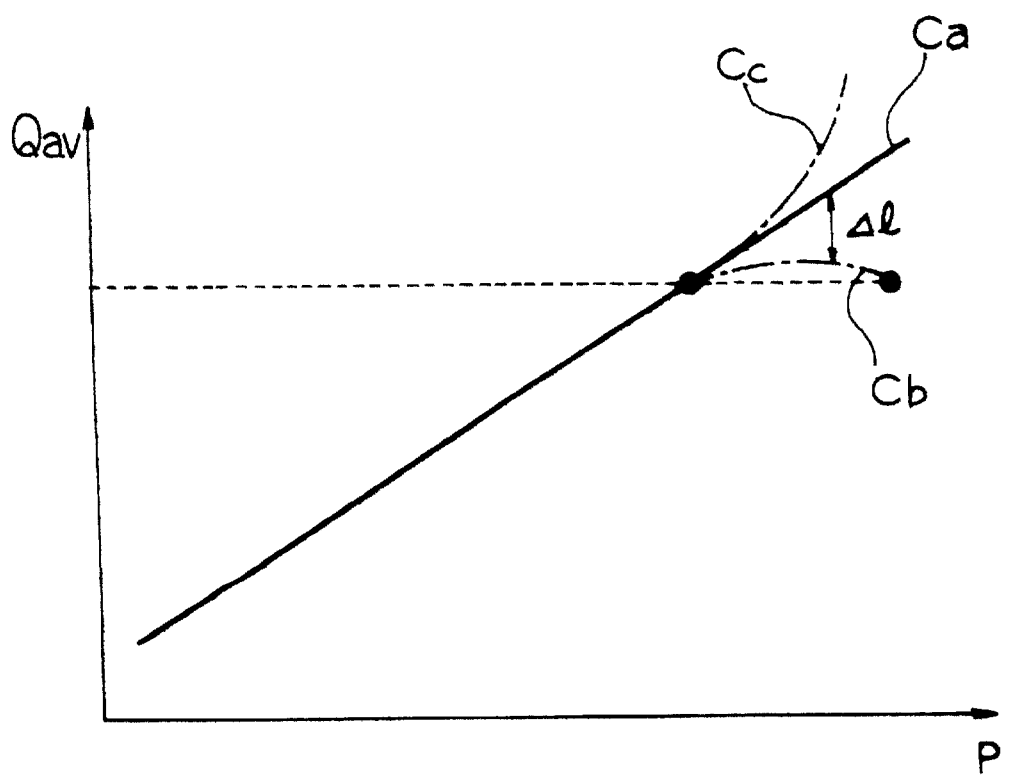
FIG. 7 is a characteristic diagram showing a relation between pressure of intake manifold according to opening of a throttle valve and average of detected flow rates.

An advantage of the gain compensating means 60 according to this Embodiment 1 can also be described in other words with reference to FIG. 7. Ideally it is desirable that an average flow rate of a pulsating flow obtained by a flow rate detector exactly follows actual flow rate defined by a line according to code Ca in FIG. 7. However, in the conventional flow rate detector, an average detected flow rate depicts a curve indicated by Cb because of transient characteristic and other factors, causing a leaning error Δl. To cope with the mentioned error, the gain compensating means 60 according to this Embodiment 1 compensates an average flow rate detected by a thermal type flow rate detector so that the average detected flow rate is raised upward as shown by a curve according to code Cc. As a result, precision in detection of flow rate is improved over an extensive pulsating frequency range from a low frequency up to a high frequency.

The foregoing description relates to a leaning error caused by the transient characteristic that generates a fluctuation in flow velocity ratio between pulsating flows through a flow detecting tube 6 and through a main flow tube 1. However, a leaning error may similarly be caused depending on the shape of a detecting element 8 or size or position of an exothermic resistor 12. Also in such a case, employing the gain compensating means 60 according to this Embodiment 1 can equally minimize a leaning error.

Embodiment 2

Figure 8:
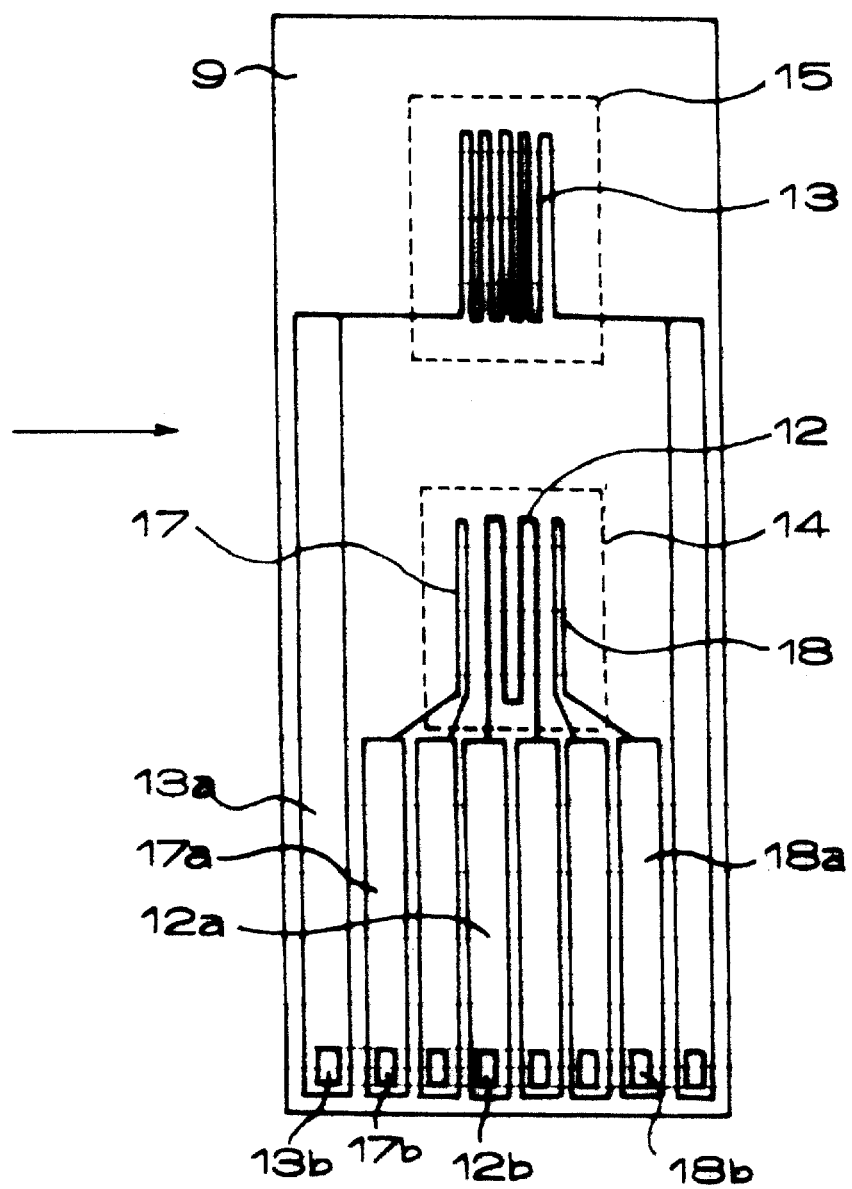
FIG. 8 is a plan view of a detecting element according to Embodiments 2 and 3 of the invention.
Figure 9:
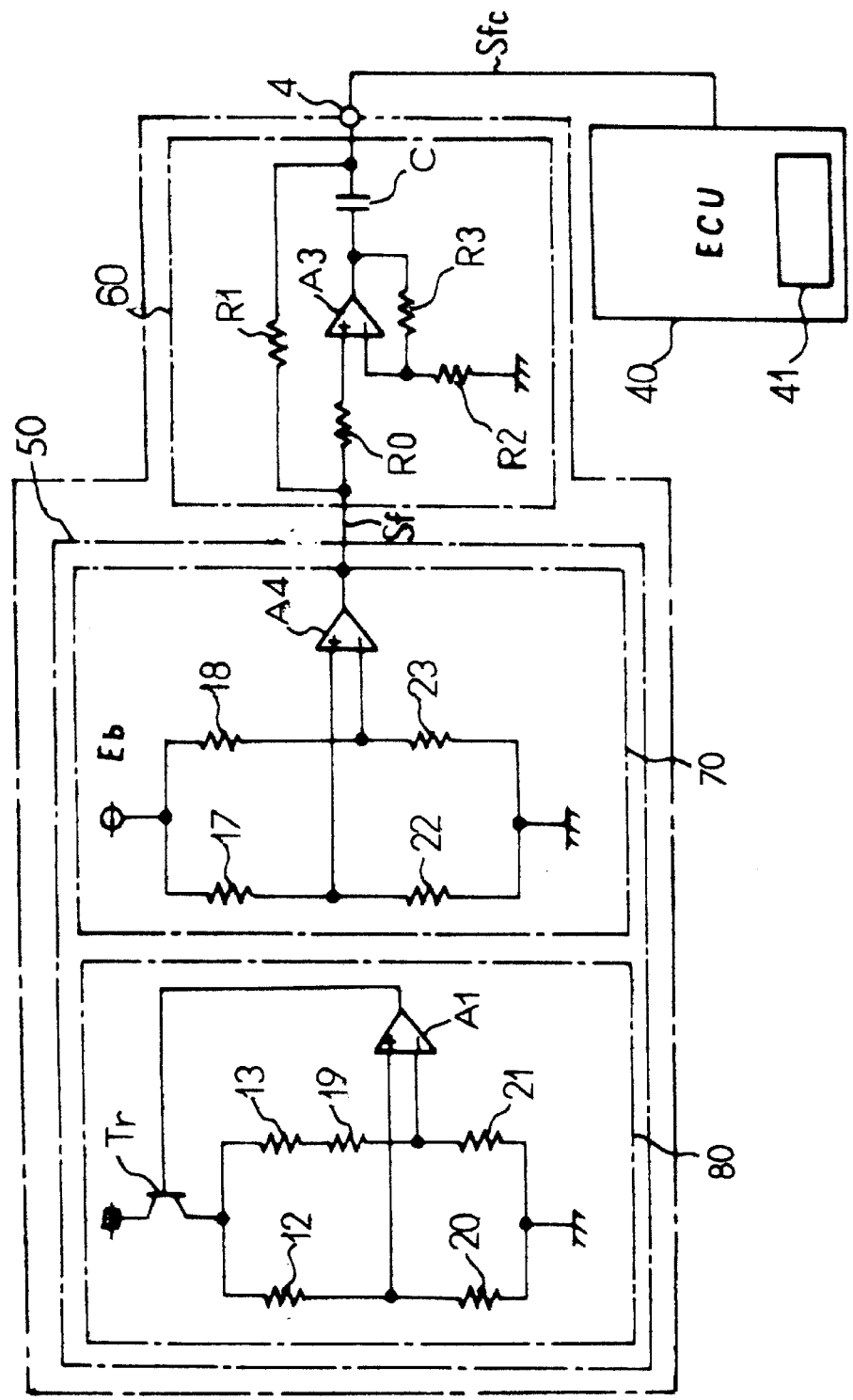
FIG. 9 is a block diagram showing an entire arrangement of a flow rate detector according to Embodiment 2 of the invention.

FIG. 8 is a plan view of a detecting element according to Embodiment 2 of the invention, and FIG. 9 is a block diagram showing an entire arrangement of the flow rate detector according to this Embodiment 2. Same reference numerals are designated to like parts as those in FIGS. 1 to 4 showing the foregoing Embodiment 1.

In this Embodiment 2, a detecting element 8 comprises an exothermic resistor 12 and a thermo-sensitive resistor 13 respectively disposed vertically on the face side of a silicon substrate 9 separated by an insulating film. And first and second thermo-sensitive resistors 17 and 18 are formed adjacent to each other putting the mentioned exothermic resistor 12 therebetween. As indicated by the arrow in FIG. 7, the first thermo-sensitive resistor 17 is located on upstream side and the second thermo-sensitive resistor 18 on downstream side, in the flowing direction of an object fluid. Further, in order to reduce the heat capacity of the resistors 12, 13, 17 and 18, diaphragms 14 and 15 are formed on the reverse side of the silicon substrate 9 at the respective positions where the mentioned resistors 12, 13, 17 and 18 are formed.

All the resistors 12, 13, 17 and 18 are made of a material such as platinum film of which resistance varies depending on temperature. All the resistors 12, 13, 17 and 18 are extended to the end of the silicon substrate 9 through leads 12a, 13a, 17a and 18a. A part of the protective film at the end of the leads 12a, 13a, 17a and 18a is removed to form electrode sections 12b, 13b, 17b and 18b for electric connection with outside terminals.

Further description on the arrangement of the detecting element 8 is omitted herein since it is the same as in the foregoing Embodiment 1.

Also, in this Embodiment 2, a detecting circuit section 30 accommodated in the circuit housing 3 consists of flow detecting means 50 and gain compensating means 60 as shown in FIG. 9. Further, the flow detecting means 50 is provided with temperature difference detecting means 70 and constant temperature controlling means 80.

The temperature difference detecting means 70 is provided with the first and second thermo-sensitive resistors 17 and 18 disposed on the detecting element 8, as well as with two fixed resistors 22 and 23, and all these resistors 17, 18, 22 and 23 forms a bridge circuit. In addition, a differential amplifier A4 is provided for amplifying a difference of an output of the bridge circuit.

In the temperature difference detecting means 70 of above arrangement, a difference in temperature due to a flow of an object fluid between the first and second thermo-sensitive resistors 17 and 18 on upstream downstream sides holding the exothermic resistor 12 therebetween as shown in FIG. 8 is converted to a voltage at the fixed resistors 22 and 23. Then the differential amplifier A4 amplifies the difference in voltage between the fixed resistors 22 and 23 and generates a flow-detecting signal Sf.

Further, the constant temperature controlling means 80 consists of a similar arrangement to the flow detecting means 50 according to the foregoing Embodiment 1 except that an operational amplifier A2 is omitted. Specifically, in the constant temperature controlling means 80, a bridge circuit is constituted by the exothermic resistor 12, thermo-sensitive resistor 13 of the mentioned detecting element 8, and three fixed resistors 19, 20 and 21. Furthermore, a differential amplifier A1 for amplifying a difference of an output of this bridge circuit, and a feedback system for maintaining a constant temperature of the exothermic resistor 12 by a transistor Tr for current control are incorporated.

Accordingly, in the of the constant temperature controlling means 80 of above arrangement, when the exothermic resistor 12 is cooled by a flow of an object fluid such as intake air, the output of the differential amplifier A1 changes the base current of the transistor Tr. Then in response to this change, the heating current supplied to the exothermic resistor 12 is increased to maintain the temperature of the exothermic resistor 12 at a constant level.

In addition, arrangement of the gain compensating means 60, and the ECU 40 and the memory 41 is basically the same as in the foregoing Embodiment 1. Setting conditions of circuit constant of the gain compensating means 60 are also the same as in the Embodiment 1. Therefore, further description on the arrangement is omitted.

Now, flow rate detecting operation of the flow rate detector according to this Embodiment 2 is described hereunder.

In the temperature difference detecting means 70, when an object fluid flows in the direction indicated by the arrow in FIG. 8, the first thermo-sensitive resistor 17 on the upstream side of the exothermic resistor 12 is cooled and the temperature thereof is lowered. On the other hand, the temperature of the second thermo-sensitive resistor 18 is not as much lowered because of the influence of the heat given from the exothermic resistor 12, and therefore a temperature difference is produced between the two thermo-sensitive resistors 17 and 18. This temperature difference augments with the increase in flow rate.

Changes in current due to the mentioned temperature difference of between the first and second thermo-sensitive resistors 17 and 18 on the upstream and downstream sides of the exothermic resistor 12 are converted to voltages by the respective fixed resistors 22 and 23. Then the difference in voltages between the mentioned two resistors 22 and 23 is amplified by the differential amplifier A4 and outputted as a flow-detecting signal Sf.

In addition, operations of the gain compensating means 60 with the flow-detecting signal Sf outputted by the temperature difference detecting means 70, and operation of the ECU 40 for processing the mentioned signal are the same as the foregoing Embodiment 1. Therefore further description on the operation of them is omitted.

Consequently, the flow rate detector according to this Embodiment 2 can precisely detects a flow rate of a pulsating flow even when the pulsation frequency is lower than a frequency f1B predetermined by thermal time constant of the first and second thermo-sensitive resistors 17 and 18, and can effectively minimize a leaning error in the same manner as in the foregoing Embodiment 1.

Furthermore, in this Embodiment 2, the first and second thermo-sensitive resistors 17 and 18 are disposed on both sides of the exothermic resistor 12 in the temperature difference detecting means 70, and the differential amplifier A4 to generate a flow-detecting signal Sf amplifies a voltage difference of the mentioned resistors. As a result, flow rate of a pulsating flow including a counter flow can also be precisely detected.

Embodiment 3

Figure 10:
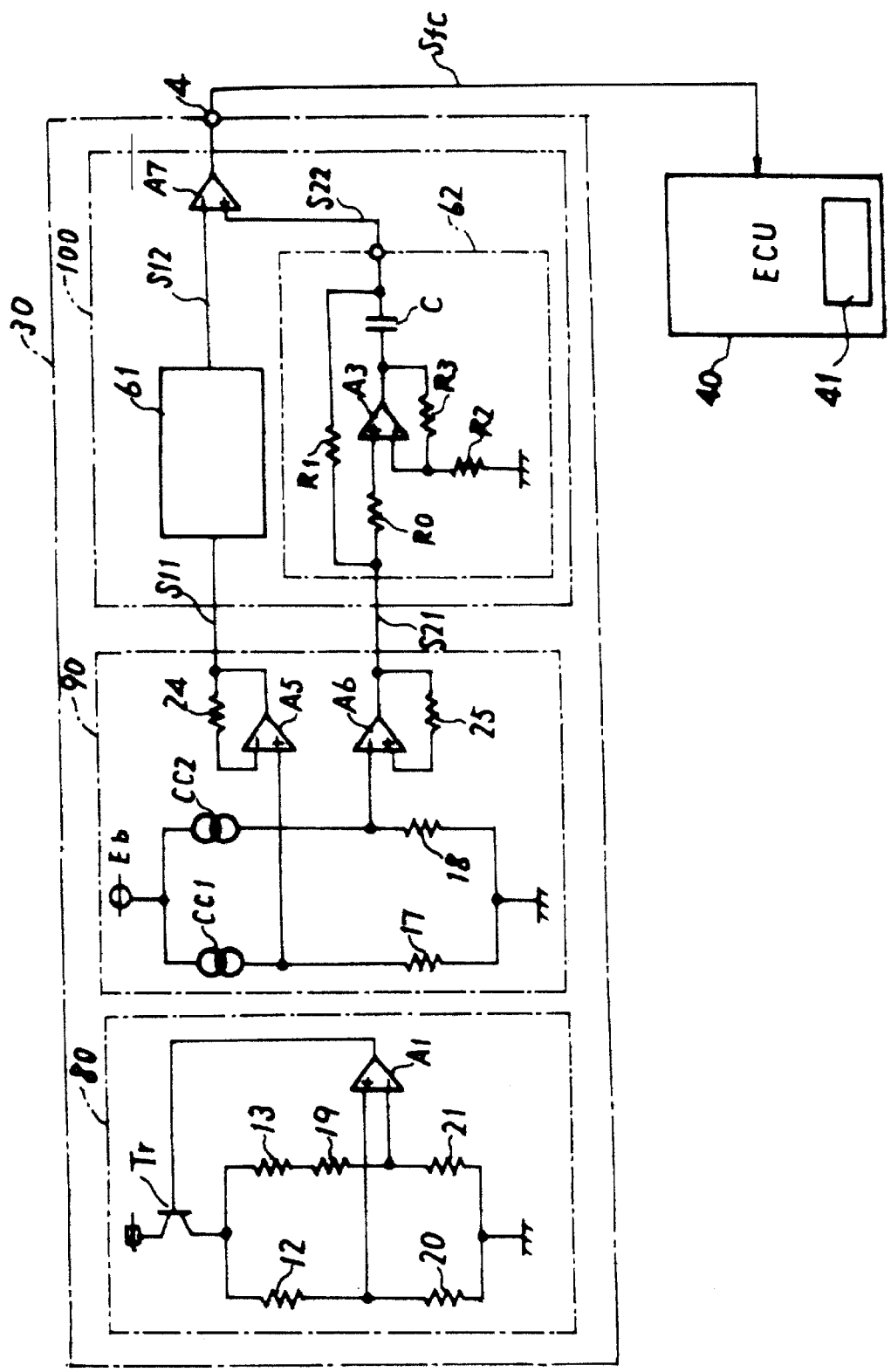
FIG. 10 is a block diagram showing an entire arrangement of a flow rate detector according to Embodiment 3 of the invention.

FIG. 10 is a block diagram showing an entire arrangement of a flow rate detector according to Embodiment 3 of the invention, and in which the same reference numerals are designated to like parts as those in FIG. 9 showing the foregoing Embodiment 2.

In this Embodiment 3, arrangement of the detecting element 8 disposed inside of a flow detecting tube 6 is identical to the foregoing Embodiment 2 shown in FIG. 8. On the other hand, the detecting circuit section 30 consists of the constant temperature controlling means 80, temperature detecting means 90 and flow rate computing means 100.

The constant temperature controlling means 80 is designed for maintaining a temperature of the exothermic resistor 12 constant, and arrangement and operation of the constant temperature controlling means 80 is similar to those in the foregoing Embodiment 2 shown in FIG. 9, and therefore further description is omitted.

The temperature detecting means 90 is designed for separately detecting the temperature of the thermo-sensitive resistors 17 and 18 respectively disposed on the upstream and downstream sides of the exothermic resistor 12 placed in an object fluid, and is provided with first and second constant current circuits CC1 and CC2, first and second thermo-sensitive resistors 17 and 18, and first and second operational amplifiers A5 and A6.

The first and second thermo-sensitive resistors 17 and 18 are separately connected to the first and second constant current circuits CC1 and CC2 respectively, and the non-inversion input terminal of the first operational amplifier A5 is connected to the middle point of connection between the first constant current circuit CC1 and the first thermo-sensitive resistor 17. Further, the output terminal and inversion input terminal of the first operational amplifier A5 are connected to each other through a feedback resistor 24. In the same manner, the non-inversion input terminal of the second operational amplifier A6 is connected to the middle point of connection between the second constant current circuit CC2 and the second thermo-sensitive resistor 18, and the output terminal and the inversion input terminal of the second operational amplifier A6 are connected to each other through a feedback resistor 25.

As a result of the foregoing arrangement, the first operational amplifier A5 amplifies a voltage according to resistance variation in the first thermo-sensitive resistor 17 and outputs a first temperature-detecting signal S11. Meanwhile the second operational amplifier A6 amplifies a voltage according to resistance variation of the second thermo-sensitive resistor 18 and outputs a second temperature-detecting signal S21.

Figure 11:
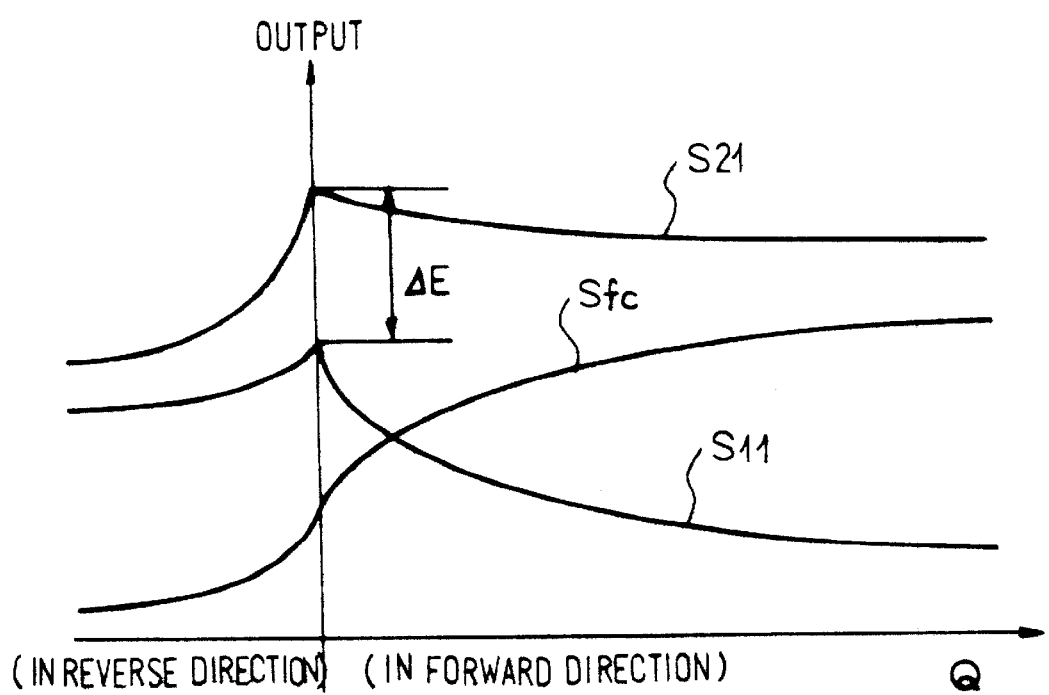
FIG. 11 is a drawing showing flow rate characteristics of a flow rate detector according to Embodiment 3 of the invention.

Though the first and second thermo-sensitive resistors 17 and 18 are under the same temperature when the flow rate is zero, it is preferable that an offset voltage of the second operational amplifier A6 is preliminarily adjusted in such a manner that the output of the second temperature detecting signal S21 becomes higher than the first temperature-detecting signal S11 by a constant difference □E even when the flow rate is zero, as shown in FIG. 11. As a result, a flow-detecting signal Sfc outputted by the flow rate computing means 100 later described shows a simple increase characteristic according to the flow rate including a counter flow area. Therefore pulsating flows can be detected not only in forward direction but also in reverse direction.

The flow rate computing means 100 consists of first phase compensating means 61 for advancing a phase and amplifying the first temperature detecting signal S11 outputted by the first operational amplifier A5 connected to the first thermo-sensitive resistor 17 disposed in the temperature detecting means 90; second phase compensating means 62 for advancing and amplifying a phase of the second temperature detecting signal S21 outputted by the second operational amplifier A6 connected to the second thermo-sensitive resistor 18; and a differential amplifier A7 for outputting a flow-detecting signal Sfc representing a difference between the output signals S12 and S22 from the respective phase compensating means 61 and 62.

Arrangement of the mentioned first and second phase compensating means 61 and 62 is identical to the gain compensating means 60 in the foregoing Embodiments 1 and 2. Also, setting conditions such as circuit constant of the first and second phase compensating means 61 and 62 are also similar to those for the gain compensating means 60 in the foregoing Embodiments 1 and 2, and therefore further description is omitted. Further description on the arrangement of the ECU 40 and the memory 41 is omitted, because it is basically the same as those in the foregoing Embodiments 1 and 2.

Now, flow rate detecting operation of the flow rate detector according to this Embodiment 3 is described hereunder.

In the temperature detecting means 90, when an object fluid flows in the direction indicated by the arrow in FIG. 8, the first thermo-sensitive resistor 17 on the upstream side of the exothermic resistor 12 is cooled and temperature thereof is lowered. On the other hand, temperature of the second thermo-sensitive resistor 18 is not as much lowered due to influence of the heat given from the exothermic resistor 12. Therefore, a temperature difference is produced between the two thermo-sensitive resistors 17 and 18, and resistance value also varies depending on the temperature difference. The mentioned temperature difference augments with the increase in flow rate.

The voltages generated according to a variation in resistance value of the first and second thermo-sensitive resistors 17 and 18 on upstream and downstream sides of the exothermic resistor 12 are separately inputted to the first and second operational amplifiers A5 and A6 respectively, both of which respectively amplify the inputted voltage in proportion to the variation in resistance value, and output the temperature detecting signals S11 and S21.

The first and second phase compensating means 61 and 62 advance the phase and amplify the respective temperature detecting signals S11 and S21, and output the signals S12 and S22 of a larger amplitude. In the aforementioned arrangement, operations of the first and second phase compensating means 61 and 62 with respect to the respective temperature detecting signals S11 and S21 outputted by the temperature detecting means 90 are the same as those in the gain compensating means 60 according to the foregoing Embodiments 1 and 2. Therefore further description is omitted.

The signals S12 and S22 respectively outputted by the first and second phase compensating means 61 and 62 are both inputted to the differential amplifier A7, which outputs a flow-detecting signal Sfc based on the difference between the signals S12 and S22. Since the mentioned flow-detecting signal Sfc has a simple increase characteristic as shown in FIG. 11, pulsating flows can equally be detected in both forward and reverse directions.

Signal processing operations of the ECU 40 for the temperature detecting signal Sfc outputted by the differential amplifier A7 in the flow rate computing means 100 are the same as in the foregoing Embodiments 1 and 2, and therefore further description is omitted.

Figure 12:
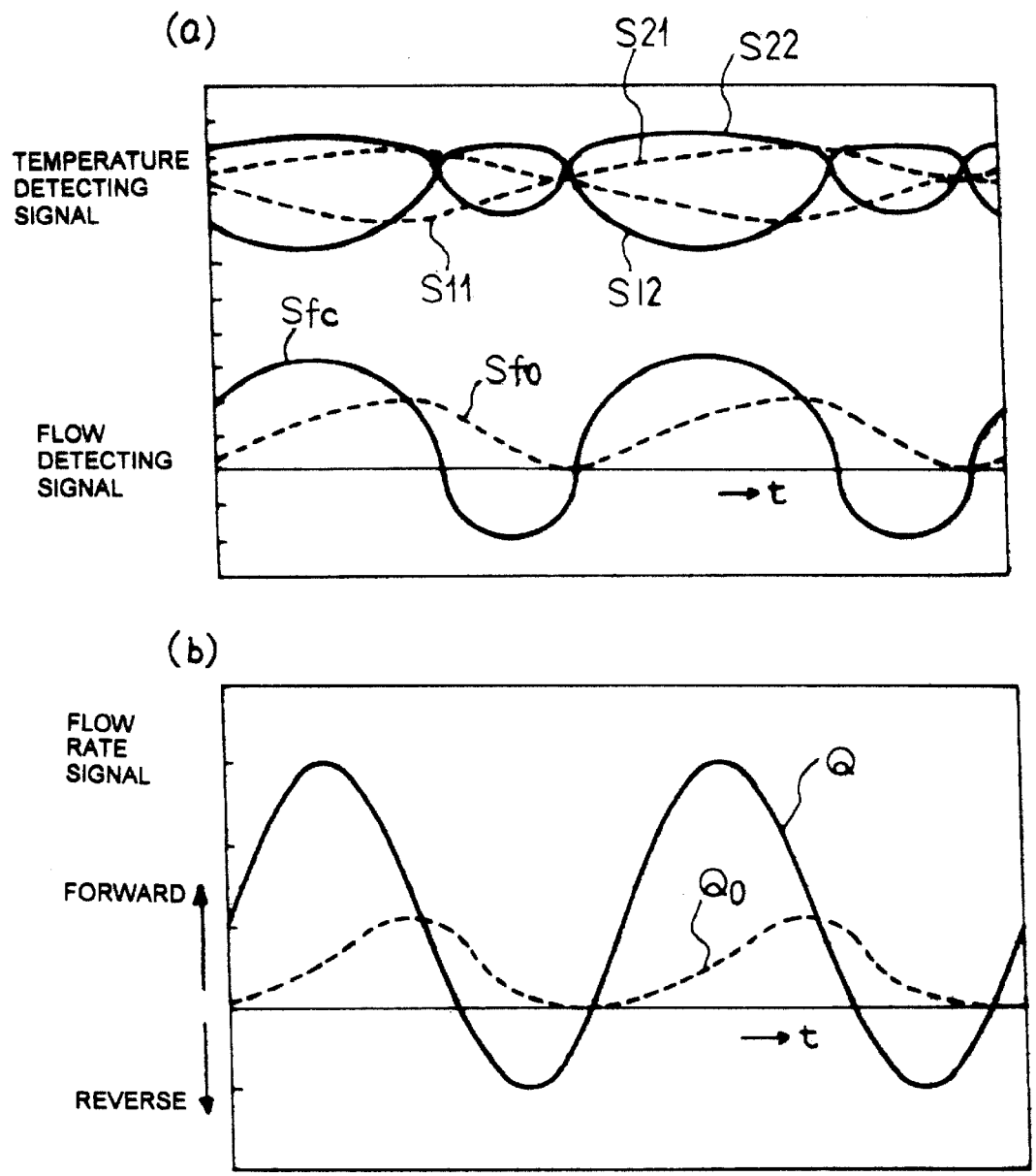
FIGS. 12 (*a*) and (*b*) are characteristic diagrams each showing waveforms of signals obtained from each part of a pulsating flow in a flow rate detector according to Embodiment 3 of the invention.

FIG. 12 is a characteristic diagram showing waveforms of signals obtained from each part of a pulsating flow in a flow rate detector according to Embodiment 3 of the invention.

When a flow rate signal Q converted according to the characteristic curve U preliminarily stored in the memory 41 in the ECU 40 has, for example, a waveform as shown in FIG. 12(*b*), respective waveforms of first and second temperature detecting signals S11 and S21 outputted by the temperature detecting means 90, and the flow-detecting signal Sfc outputted by the flow rate computing means 100 are as shown in FIG. 12(*a*).

Referring to FIG. 12(*a*), the output signal S12 from the first phase compensating means 61 represents a signal outputted after compensating a phase delay in the first temperature detecting signal Sll, and the output signal S22 from the second phase compensating means 62 represents a signal outputted after compensating a phase delay in the second temperature detecting signal S21. Since the output signals S12 and S22 from the phase compensating means 61 and 62 are generated after advancing a phase of the temperature detecting signals S11 and S21 and amplifying the amplitude thereof, waveforms of the output signals S12 and S22 become similar to those obtained when the thermal time constant of the first and second thermo-sensitive resistors 17 and 18 is reduced.

In the foregoing arrangement according to this Embodiment 3, the phases of the temperature detecting signals S12 and S22 are advanced and the amplitude of the signals becomes larger according to pulsating frequency when the flow is pulsating at a frequency higher than a predetermined frequency f2A. Therefore, the thermal time constant of the first and second thermo-sensitive resistors 17 and 18 apparently becomes smaller, resulting in a quicker response of the flow-detecting signal Sfc with respect to a pulsating flow including a counter flow. Consequently, when the flow-detecting signal Sfc is converted to a flow rate signal according to the characteristic curve U preliminarily stored in the memory 41 in the ECU 40, the flow rate signal Q that faithfully tracks the variation in actual flow rate is attained. Thus a largely improved detecting precision is achieved.

Further, code Sfo in FIG. 12(*a*) shows a flow-detecting signal to be produced when the first and second phase compensating means 61 and 62 are not involved. On the other hand, code Qo in FIG. 12(*b*) shows a flow rate signal to be produced upon converting the mentioned flow-detecting signal Sfo into a flow rate signal according to the characteristic curve U preliminarily stored in the memory 41. In this manner, it is understood that an average detected flow rate becomes lower than actual flow rate Q, and a counter flow is not detected due to delay, when the phase compensating means 61 and 62 are not involved.

What is claimed is:

1. A flow rate detector comprising:

flow-detecting means for outputting a flow-detecting signal according to a flow rate of an object fluid utilizing heat transfer phenomenon to the object fluid from an exothermic resistor disposed in a fluid passage; and gain compensating means for compensating a gain of said flow-detecting signal by amplifying said signal outputted by said flow detecting means;

wherein said gain compensating means amplifies said flow-detecting signal with a substantially constant alternating current gain larger than a direct current gain at the time of zero frequency in a frequency range higher than a minimum pulsating frequency of the object fluid.

2. The flow rate detector according to claim 1, wherein said gain compensating means amplifies an alternating current gain by 1.05 to 1.3 times, in the frequency range higher than the minimum pulsating frequency of said object fluid.

3. The flow rate detector according to claim 1, wherein said gain compensating means is provided with an operational amplifier, a capacitor for determining a frequency characteristic connected to the rear side of said operational amplifier, a by-pass resistor connected in parallel to a series circuit between the operational amplifier and the capacitor, and a resistor for determining an alternating current gain connected to an inversion input terminal of said operational amplifier.

4. A flow rate detector comprising:

temperature difference detecting means for detecting a difference between temperatures of thermo-sensitive resistors respectively disposed on upstream side and downstream side of an exothermic resistor disposed in a fluid passage; and gain compensating means for compensating a gain of a flow-detecting signal by amplifying a temperature difference detecting signal from said temperature difference detecting means inputted as flow-detecting signal;

wherein said gain compensating means amplifies said flow-detecting signal with a substantially constant alternating current gain larger than a direct current gain at the time of zero frequency in a frequency range higher than a minimum pulsating frequency of the object fluid.

5. The flow rate detector according to claim 4, wherein said gain compensating means amplifies an alternating current gain by 1.05 to 1.3 times, in the frequency range higher than the minimum pulsating frequency of said object fluid.

6. The flow rate detector according to claim 4, wherein said gain compensating means is provided with an operational amplifier, a capacitor for determining a frequency characteristic connected to the rear side of said operational amplifier, a by-pass resistor connected in parallel to a series circuit between the operational amplifier and the capacitor, and a resistor for determining an alternating current gain connected to an inversion input terminal of said operational amplifier.

7. A flow rate detector comprising:

temperature detecting means for separately detecting temperatures of thermo-sensitive resistors respectively disposed on upstream side and downstream side of an exothermic resistor disposed in a fluid passage; and flow rate computing means for computing a flow-detecting signal based on a temperature detecting signal outputted by said temperature detecting means;

wherein said flow rate computing means consists of: first phase compensating means for amplifying and outputting a phase-advanced temperature detecting signal of an advanced phase corresponding to a temperature of a thermo-sensitive resistor disposed on upstream side of said exothermic resistor; second phase compensating means for amplifying and outputting a temperature detecting signal of an advanced phase corresponding to a temperature of a thermo-sensitive resistor disposed on downstream side of said exothermic resistor; and a differential amplifier for outputting as a flow-detecting signal a difference between output signals from said respective phase compensating means.

8. The flow rate detector according to claim 7, wherein both of said first and second phase compensating means consist of gain compensating means for amplifying said temperature detecting signal by a substantially constant alternating current gain larger than a direct current gain at the time of zero frequency, in the frequency range higher than the minimum pulsating frequency of said object fluid.

9. The flow rate detector according to claim 8, wherein said gain compensating means amplifies an alternating current gain by 1.05 to 1.3 times, in the frequency range higher than the minimum pulsating frequency of said object fluid.

* * * * *